US012584550B1

(12) United States Patent
Reichert

(10) Patent No.: US 12,584,550 B1
(45) Date of Patent: Mar. 24, 2026

(54) DIFFERENTIAL WITH DISCONNECT AND LOCKING MECHANISMS

(71) Applicant: GKN Automotive Limited, Birmingham (GB)

(72) Inventor: Paul F. Reichert, Rochester Hills, MI (US)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 19/191,454

(22) Filed: Apr. 28, 2025

(51) Int. Cl.
| *F16H 48/24* | (2006.01) |
| *F16H 48/08* | (2006.01) |
| *F16H 48/34* | (2012.01) |
| *B60K 23/08* | (2006.01) |
| *F16H 48/40* | (2012.01) |

(52) U.S. Cl.
CPC ............. *F16H 48/24* (2013.01); *F16H 48/08* (2013.01); *F16H 48/34* (2013.01); *B60K 23/08* (2013.01); *F16H 2048/346* (2013.01); *F16H 48/40* (2013.01)

(58) Field of Classification Search
CPC ......... F16H 48/40; F16H 48/24; B60K 23/08; B60K 2038/0858; B60K 17/165; B60K 2023/0858
See application file for complete search history.

(56) References Cited

U.S. PATENT DOCUMENTS

| 4,788,888 | A | * | 12/1988 | Tsutsumikoshi | ........ | F16H 48/30 |
| | | | | | | 180/250 |
| 5,086,867 | A | * | 2/1992 | Hirota | ..................... | F16H 48/30 |
| | | | | | | 180/250 |
| 6,958,030 | B2 | * | 10/2005 | DeGowske | ............. | F16H 48/34 |
| | | | | | | 188/161 |
| 7,081,065 | B2 | * | 7/2006 | Sudou | ..................... | F16H 48/34 |
| | | | | | | 475/230 |
| 7,294,085 | B2 | * | 11/2007 | Pistagnesi | ............... | F16H 48/24 |
| | | | | | | 475/231 |
| 8,845,475 | B2 | * | 9/2014 | Mayr | ..................... | F16H 48/30 |
| | | | | | | 74/606 R |
| 10,308,113 | B2 | * | 6/2019 | Inose | ................... | B60K 17/165 |
| 12,234,901 | B2 | * | 2/2025 | Lee | ......................... | F16H 48/34 |

FOREIGN PATENT DOCUMENTS

| CN | 116906529 | A | * | 10/2023 | ............. | F16H 48/22 |
| DE | 102018007237 | A1 | | 4/2019 | | |
| JP | 2007333133 | A | | 12/2007 | | |
| WO | WO-2024010927 | A1 | * | 1/2024 | ............. | F16H 48/38 |

* cited by examiner

*Primary Examiner* — Sherry L Estremsky
(74) *Attorney, Agent, or Firm* — Reising Ethington P.C.

(57) ABSTRACT

A drivetrain device includes a first housing, a second housing, differential gears coupled to the second housing, and a clutch. The clutch has a first member that is coupled to the second housing, a second member that is coupled to the first side gear, and a third member that is coupled to the first housing. The third member is movable relative to both the first member and the second member so that the clutch has a first position in which the third member is engaged with the second member but not the first member, the clutch has a second position in which the third member is not engaged with either the second member or the first member, and the clutch has a third position in which the third member is engaged with the first member but not the second member.

20 Claims, 3 Drawing Sheets

DIFFERENTIAL WITH DISCONNECT AND LOCKING MECHANISMS

TECHNICAL FIELD

The present disclosure relates generally to a differential for a vehicle.

BACKGROUND

Vehicles include differentials that permit wheels of the vehicle to turn at different speeds, such as is needed when the vehicle is turning. Some differentials can include a lock that is engaged to drive wheels coupled to the differential with the same torque, in known manner. And some differentials include a disconnect device by which torque from a vehicle engine can be selectively provided or not to the wheels coupled to the differential so that the vehicle can be operated in 2-wheel drive and 4-wheel or all-wheel drive modes.

SUMMARY

In at least some implementations, a drivetrain device includes a first housing arranged to be rotated by a vehicle motive power source, a second housing, differential gears coupled to the second housing, the differential gears including at least one pinion gear, a first side gear engaged with the pinion gear, and a second side gear engaged with the pinion gear, and a clutch. The clutch has a first clutch member that is coupled to the second housing, a second clutch member that is coupled to the first side gear, and a third clutch member that is coupled to the first housing. The third clutch member is movable relative to both the first clutch member and the second clutch member so that the clutch has a first position in which the third clutch member is engaged with the second clutch member but not the first clutch member, the clutch has a second position in which the third clutch member is not engaged with either the second clutch member or the first clutch member, and the clutch has a third position in which the third clutch member is engaged with the first clutch member but not the second clutch member.

In at least some implementations, the first clutch member is defined by drive features formed on part of the second housing and arranged to be engaged with complementary drive features of the third clutch member, and wherein the second clutch member is defined by drive features formed on part of the first side gear and arranged to be engaged with complementary drive features of the third clutch member.

In at least some implementations, the second position is between the first position and the third position so that the third clutch member is moved axially in a first direction from the second position to the first position, and the third clutch member is moved axially in a second direction from the second position to the third position.

In at least some implementations, the first clutch member is defined at least in part by teeth formed on part of the second housing, and the third drive member has a first set of teeth that are arranged to mesh with the teeth of the first clutch member. In at least some implementations, the second clutch member is defined at least in part by teeth formed on part of the side gear, and the third drive member has a second set of teeth that are arranged to mesh with the teeth of the second clutch member.

In at least some implementations, the device also includes an actuator carried by the first housing and operable to move the third clutch member relative to the first clutch member and the second clutch member. In at least some implementations, the actuator is an electromagnetic actuator having a coil that, when powered, produces a magnetic field to drive a drive member that in turn moves the third clutch member.

In at least some implementations, the actuator includes a magnet that is coupled to the drive member for movement with the drive member, and the actuator has a retention surface to which the magnet is magnetically coupled when the clutch is in the first position so that the drive member retains the third clutch member in a position that corresponds to the first position of the clutch even when electricity supply to the coil is reduced or terminated while the clutch is in the first position. In at least some implementations, the actuator includes a magnet that is coupled to the drive member for movement with the drive member, and the actuator has a retention surface to which the magnet is magnetically coupled when the clutch is in the third position so that the drive member retains the third clutch member in a position that corresponds to the third position of the clutch even when electricity supply to the coil is reduced or terminated while the clutch is in the third position.

In at least some implementations, the actuator includes a magnet that is coupled to the drive member for movement with the drive member, and the actuator has a first retention surface to which the magnet is magnetically coupled when the clutch is in the first position so that the drive member retains the third clutch member in a position that corresponds to the first position of the clutch even when electricity supply to the coil is reduced or terminated while the clutch is in the first position, and wherein the actuator has a second retention surface to which the magnet is magnetically coupled when the clutch is in the third position so that the drive member retains the third clutch member in a position that corresponds to the third position of the clutch even when electricity supply to the coil is reduced or terminated while the clutch is in the third position.

In at least some implementations, the device also includes at least one biasing member that provides a force on the drive member that retains the drive member and the third clutch member in a position that corresponds to the second position of the clutch in at least some operating conditions of the device.

In at least some implementations, the device also includes at least one biasing member that provides a force on the drive member that retains the drive member and the third clutch member in a position that corresponds to the second position of the clutch in at least some operating conditions of the device.

In at least some implementations, a drivetrain device includes an outer housing arranged to be rotated by a vehicle motive power source, an inner housing received at least partially in the outer housing and capable of rotation relative to the outer housing, differential gears coupled to the second housing, the differential gears including at least one pinion gear, a first side gear engaged with the pinion gear, and a second side gear engaged with the pinion gear, and a clutch. The clutch has a first clutch member that is coupled to the second housing, a second clutch member that is coupled to the first side gear, and a third clutch member that is coupled to the first housing and slidably movable relative to each of the first housing, the first clutch member and the second clutch member. The clutch has a first position in which the third clutch member is engaged with and co-rotates with the second clutch member, the clutch has a second position in which the third clutch member is not engaged with either the second clutch member or the first clutch member, and the clutch has a third position in which the third clutch member is engaged with and co-rotates with the first clutch member.

BRIEF DESCRIPTION OF THE DRAWINGS

The following detailed description of preferred embodiments and best mode will be set forth with reference to the accompanying drawings, in which.

DETAILED DESCRIPTION

Figure 1:
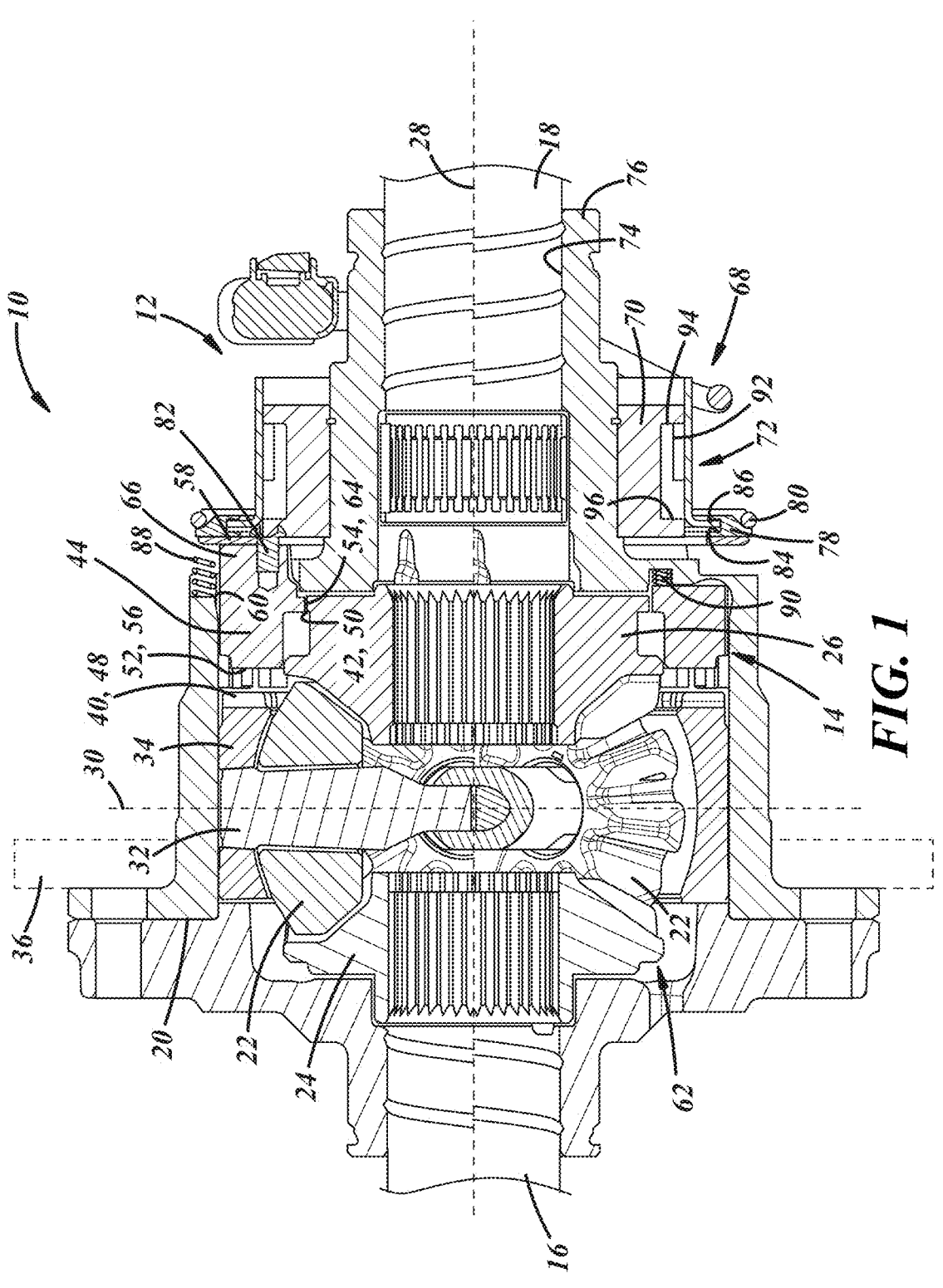
FIG. 1 is a sectional view of a drivetrain component, shown as a differential that includes a clutch having multiple positions that define multiple states of the differential, and with the clutch shown in a first position.
Figure 2:
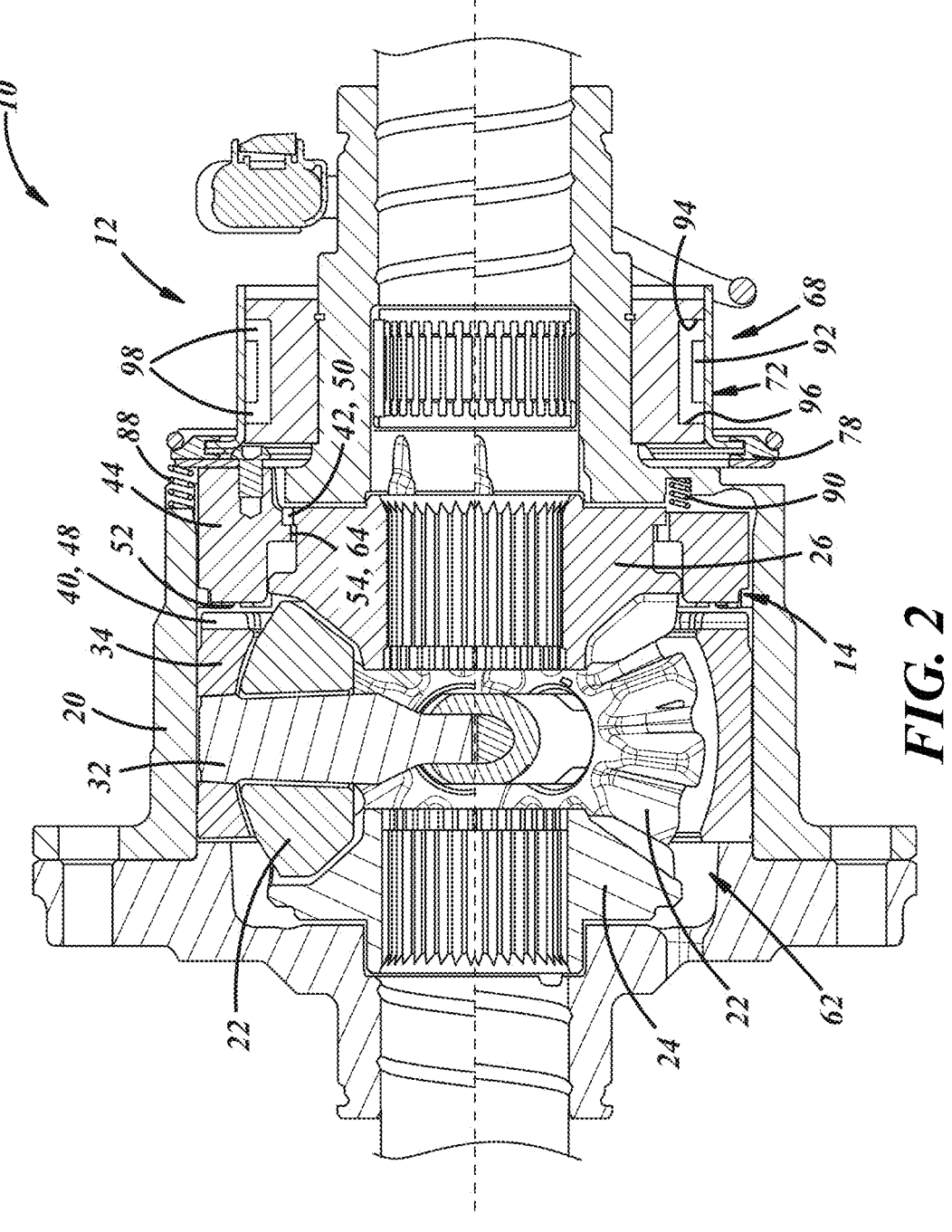
FIG. 2 is similar to FIG. 1 and shows the clutch in a second position.
Figure 3:
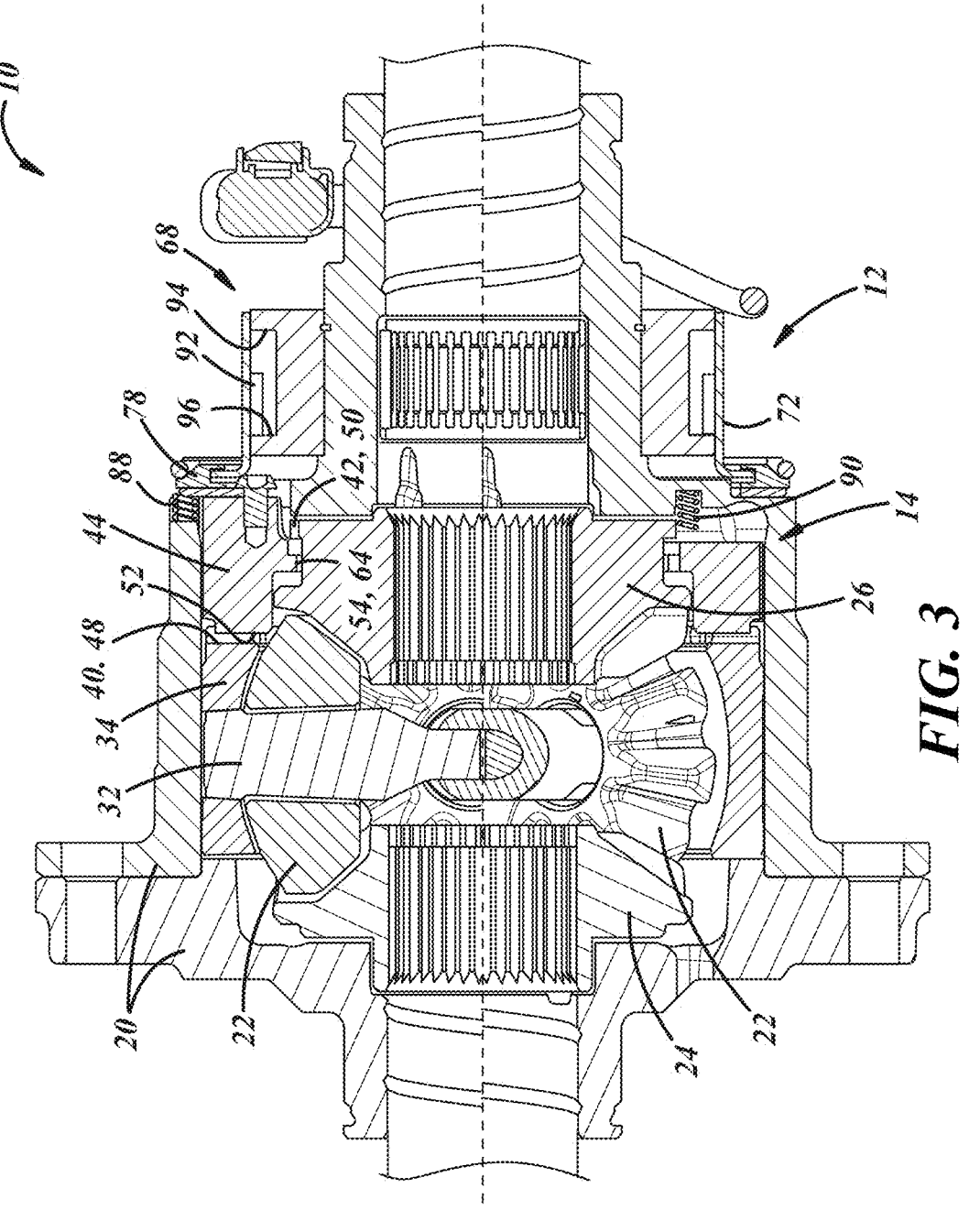
FIG. 3 is similar to FIG. 1 and shows the clutch in a third position.

Referring in more detail to the drawings, FIGS. 1-3 illustrate a drivetrain device, shown as a differential 10, that includes a disconnect and locking mechanism 12 defined in part by a clutch 14 having multiple positions. The disconnect and locking mechanism 12 permits torque to be selectively provided through the differential 10. In this way, a vehicle including the differential 10 may be operated, for example, in a 2-wheel drive mode when the disconnect mechanism 12 is in a disconnected state, and a 4-wheel drive mode when the disconnect mechanism 12 is in a connected state and torque is transmitted through the differential 10. The disconnect and locking mechanism 12 also permits the differential 10 to be operated in an open mode permitting rotation of two output shafts 16, 18 (shown diagrammatically in FIG. 1) at different speeds, and in a locked mode in which the output shafts 16, 18 rotate at the same speed. The differential 10 may be used in a variety of vehicles, including those powered by different motive power devices or sources, such as a combustion engine, electric motor, or both, to provide selective 4-wheel drive and to permit selective locking of the differential 10.

The differential 10 includes a first, or outer housing 20, two or more pinion gears 22, and a pair of side gears 24, 26 that are arranged to be coupled to the rotating shafts 16, 18 that may drive, for example, wheels of a vehicle. Thus, the side gears 24, 26 rotate with the shafts 16, 18 about a shaft axis 28 and the pinion gears 22 are rotatable about an axis 30 defined by a pinion gear shaft 32 extending through the pinion gears 22. The pinion gear shaft 32 is connected to a second, or inner housing 34 that is rotatable relative to the outer housing 20. The outer housing 20 is coupled to and rotates with an outer, ring gear 36 (shown diagrammatically in FIG. 1) that is driven by the vehicle motive power source (e.g. engine, motor or both).

The multiple position clutch 14 defines at least part of the disconnect and locking mechanism 12 and, when in the connected state, couples the inner housing 34 to the outer housing 20 so that the inner housing 34 rotates with the outer housing 20. The clutch 14, in at least some implementations, is an engaging clutch such as a dog clutch. The clutch 14 includes a first clutch member 40 that is not movable in an axial direction (defined by the central axis 28), a second clutch member 42 that is not movable in the axial direction, and a third clutch member 44 that is movable in the axial direction and relative to the first clutch member 40 and the second clutch member 42 to selectively mesh with, contact or engage the first clutch member 40 and the second clutch member 42.

The first clutch member 40 may include or be defined by drive features, such as splines, teeth 48 or other drive features, formed on the inner housing 34 or a component fixed to the inner housing 34. The teeth 48 of the first clutch member 40 extend axially and radially, and are circumferentially spaced apart, and may be one or both of radially and axially spaced from teeth 50 of the second clutch member 42 (relative to the axis of rotation 28 of the side gear 26).

The second clutch member 42 may be annular, and coaxial with one of the side gears 26, and may include or be defined by drive features, such as splines or teeth 50 or other drive features, such as radially outwardly and axially extending and circumferentially spaced teeth that are formed in and extend from the side gear 26. In other words, the second clutch member teeth 50 may be part of an integrally formed in the same body as the remainder of the side gear 26.

The third clutch member 44 is coupled to the outer housing 20 and rotates with the outer housing 20. The third clutch member 44 may be a clutch ring, that is, an annular body that is axially movable relative to the first clutch member 40 and the second clutch member 42. So that the third clutch member 44 can be meshed/engaged with the first and second clutch member 40, 42, the third clutch member 44 includes mating drive features, such as splines or teeth, arranged in two sets. A first set of teeth 52 is arranged to mesh with the teeth 48 of the first clutch member 40 and are located radially outwardly and axially inwardly of a second set of teeth 54 that is arranged to mesh with the teeth 50 of the second clutch member 42. The first set of teeth 52 may extend axially from an axial end face 56 of the third clutch member 44 that is opposite to a second axial end face 58 which is at least partly exposed or extends through openings 60 in the outer housing 20 that communicate an interior 62 of the outer housing 20 with an exterior of the outer housing 20. The second set of teeth 54 may extend from a radially inner surface 64 of the third clutch member 44, where the inner surface 64 overlaps an outer surface of the side gear 26.

In use, the third clutch member 44 has a first or retracted position, shown in FIG. 1, a second or intermediate position, shown in FIG. 2, and a third or advanced position, shown in FIG. 3. In the retracted position shown in FIG. 1, the first set of teeth 52 of the third clutch member 44 is not in contact with the first clutch member teeth 48, and the second set of teeth 54 of the third clutch member 44 is in contact with the second clutch member teeth 50. In this position, the third clutch member 44 connects the side gear 26 with the outer housing 20, which defines a locked state of the differential.

When the clutch 14 is in the intermediate position shown in FIG. 2, the third clutch member 44 is not engaged with the first clutch member 40 or the second clutch member 42 (e.g. the third clutch member teeth 52 are not meshed with the first clutch member teeth 48, and third clutch member teeth 54 are not meshed with the second clutch member teeth 50). This intermediate position defines the disconnected state of the differential wherein the outer housing 20 is not connected to the inner housing 34, and the outer housing 20 can rotate relative to the side gears 26 and side shafts such that torque is not transmitted through the differential 10.

When the clutch 14 is in the advanced position shown in FIG. 3, the first set of teeth 52 of the third clutch member 44 is in contact with the first clutch member teeth 48 and the second set of teeth 54 of the third clutch member 44 is not in contact with the second clutch member teeth 50. The advanced position defines the connected state of the disconnect and locking mechanism 12 wherein the inner housing 34 rotates with the outer housing 20 and torque is transmitted through the differential 10.

Thus, the teeth 50 of the second clutch member 42 are provided along only part of an axial length of overlap between the third clutch member 44 and the side gear 26. In this way, when the third clutch member 44 is axially retracted, the teeth 50 of the second clutch member 42 are meshed with the second set of teeth 54 of the third clutch member 44, but when the third clutch member 44 is axially moved to either the intermediate or advanced positions, the second and third clutch members 42, 44 are not engaged (e.g. the teeth 50, 54 are spaced from each other and not meshed with each other). Further, the axial location at which the third clutch member 44 engages the second clutch member 42 is spaced from the axial location at which the third clutch member 44 engages the first clutch member 40. In at least some implementations, the second position of the third clutch member 44 is between the first position and the third position so that the third clutch member 44 is moved axially in a first direction from the second position to the first position, and the third clutch member 44 is moved axially in an opposite, second direction from the second position to the third position.

In at least some implementations, the third clutch member 44 may be keyed or splined to the outer housing 20, with one or more keys/projections received in complementary slots arranged axially (e.g. parallel to the axis 28), to permit axial movement of the third clutch member 44 relative to the inner housing 34 and the side gear 26, while maintaining the third clutch member 44 coupled to the outer housing 20 for co-rotation with the outer housing 20. The third clutch member 44 could have multiple circumferentially spaced apart and axially extending legs 66 (one is shown and labeled in FIG. 1) received in, exposed to or extending through openings 60 in the outer housing 20 to facilitate coupling the third clutch member 44 to an actuator 68 of the clutch 14.

The actuator 68, which may be an electromagnetic actuator, but could be an electric motor or other type of actuator, causes linear movement of the third clutch member 44 relative to the first and second clutch members 40, 42 between the retracted, intermediate and advanced positions. In the example of an electromagnetic actuator, the clutch actuator 68 has a solenoid with an annular wire coil 70 and an armature or drive member 72 that may be received at least partially radially outwardly of and axially overlapped with the coil 70. In at least some implementations, the drive member 72 is also annular, the drive member 72 and coil 70 are coaxially arranged about the axis 28 and are carried by the outer housing 20. So arranged, one shaft 18 extends coaxially through a first bore 74 in a tubular first shaft mount 76 of the outer housing 20 over which the coil 70 and drive member 72 of the actuator 68 are received. The shafts 16, 18 are coaxially aligned and extend outwardly from the outer housing 20 in opposite directions (e.g. 180 degrees opposed).

The drive member 72 may be formed from multiple materials including a material that is magnetically responsive to the magnetic field generated by the coil 70, and at least one other material that may or might not be responsive to the magnetic field. Thus, when the magnetic field is generated by the coil 70, the drive member 72 may be driven from one position to another (e.g. from the retracted to the advanced position). As used herein, a material is responsive to a magnetic field if a magnetic field of the magnitude generated by a solenoid of the type used in applications such as that described herein, may cause a component formed of or including such material to be displaced. When electric power is supplied to the coil 70 of the actuator 68, a magnetic field is generated that displaces the drive member 72 relative to the coil 70 and outer housing 20.

The drive member 72 is connected to the third clutch member 44 so that movement of the drive member 72 causes movement of the third clutch member 44. In the example shown, the drive member 72 is connected to a pressure plate 78 by a snap-ring 80 or similar retainer (by way of non-limiting examples of connection) and the pressure plate 78 is coupled to the third clutch member 44, such as by threaded fasteners 82 (or otherwise, as desired). The pressure plate 78 includes a recess 84 in which one or more radially outwardly extending flanges 86 (or a rim) of the drive member 72 are received. In this way, the drive member 72, through the flange(s) 86, can impart both pushing and pulling forces on the pressure plate 78 to both push and pull the third clutch member 44 to and between its retracted, intermediate and advanced positions.

In addition to the magnetic field generated by the actuator 68, a biasing member, such as a spring 88 may act on the drive member 72, or on a component engaged with the drive member 72, such as the pressure plate 78. The spring 88 may provide a force tending to move the drive member 72 and hence, the third clutch member 44, toward the retracted position. A second spring 90 may be provided between the outer housing 20 and the third clutch member 44, to yieldably bias the third clutch member 44 away from the retracted position, in the direction opposite to the force of the first spring 88 on the pressure plate 78. In at least some implementations, the spring pre-loads may be used to move the third clutch member 44 to the intermediate position when the coil is not powered, so that the differential is in the disconnected state.

Further, the drive member 72 may include a magnet 92 that is attracted to a housing of the coil 70, or a magnetic component on the housing or a component adjacent to the housing. As shown in FIG. 1, the magnet 92 is attracted to a first retention surface 94 when the coil is activated to move the drive member 72 to the first, retracted position. The magnet 92 is selected so that, when power to the coil is subsequently reduced or terminated, the magnet 92 is magnetically coupled to the first retention surface 94 with sufficient force to hold the drive member 72 in this position, and thus, retain the third clutch member 44 in the retracted position, against the force of the spring(s) tending to move the third clutch member 44 away from the retracted position. In this way, without needing to continually power the coil (or with reduced power supplied to the coil), the differential can be maintained in the locked state.

Similarly, as shown in FIG. 3, the magnet 92 is attracted to and can become magnetically coupled to a second retention surface 96, that is axially spaced from the first retention surface 94, when the coil 70 is activated to move the drive member 72 and third clutch member 44 to the advanced position. When power to the coil 70 is subsequently reduced or terminated, the magnet 92 can remain magnetically coupled to the second retention surface 96 and hold the drive member 72 in this position, against the opposing spring force, and thus, retain the third clutch member 44 in the advanced position. Thus, the differential can be maintained in the connected state even without power being provided to the coil (or with reduced power provided to the coil).

In this way, the three positions of the third clutch member 44, corresponding to the three states of the differential, can be maintained without having to continually power the coil 70. That is, the drive member 72 and third clutch member 44 can be maintained in the three positions by spring forces (or other yieldable biasing forces) and by the magnetic attraction via a yieldable retention force provided between the magnet 92 and retention surfaces 94, 96. In the implementations shown, air gaps 98 are provided between the magnet 92 and both the first and second retention surfaces 94, 96 when the drive member 72 is in the intermediate position (e.g. the position that corresponds to the intermediate position of the third clutch member 44). The air gaps are sufficient to prevent a magnetic force between the magnet 92 and retention surfaces 94, 96 from moving the drive member 72 and causing the third clutch member 44 to unintentionally move from the intermediate position, which provides stability to maintain the disconnected state of the differential 10. While a magnet 92 and magnetic attraction to retention surfaces 94, 96 is used to provide stability in the retracted and advanced positions, other arrangements may be used to hold the drive member 72, such as but not limited to detents, and thus the third clutch member 44, in one or more of the positions. In this way, a single clutch member 44 can be used to enable three different states of the differential, with a single actuator 68. And this can be done with an actuator 68 that does not need to be continually powered (or can be powered at a reduced magnitude) to maintain the positions of the clutch member 44 and the desired state of the differential 10.

In the example of FIGS. 1-4, the coil 70 is located on the shaft mount 68, and the drive member 72 and pressure plate 78 are located outboard of the interior 62 of the outer housing 20, where the gears 22, 24, 26, inner housing 34 and pinion gear shaft 32 are received within the interior 62. The third clutch member 44, or the drive member 72, or both, may extend through openings 60 in the outer housing 20 so that the first and second sets of teeth 52, 54 of the third clutch member 44 are located within the interior 62 to mesh with the teeth 48, 50 of the first and second clutch members 40, 42, as set forth herein. The third clutch member 44 includes teeth or other drive features arranged to engage the first and second clutch members 40, 42, and radial splines that enable axial movement of the third clutch member 44 relative to the outer housing 20 while coupling the third clutch member 44 to the outer housing 20 for co-rotation of these components.

In at least some implementations, a differential disconnection and locking mechanism can be provided with a single actuator 68 driving a single clutch member 44 to multiple positions. Among other things, this reduces the weight and cost and complexity of the device at least as compared to devices having multiple clutches with separate/multiple actuators. Further, the clutch member 44 can be retained in one or more and up to all positions without needing to provide electrical power to the actuator 68, or at least with a reduced power provided to the actuator 68. This improves the efficiency of the device, and reduces the cost to operate the device, and reduces the energy demand of the device so that electrical energy can be directed elsewhere in the vehicle, as needed.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A drivetrain device, comprising:
a first housing arranged to be rotated by a vehicle motive power source;
a second housing;
differential gears coupled to the second housing, the differential gears including at least one pinion gear, a first side gear engaged with the pinion gear, and a second side gear engaged with the pinion gear; and
a clutch having a first clutch member that is coupled to the second housing, a second clutch member that is coupled to the first side gear, and a third clutch member that is coupled to the first housing, wherein the third clutch member is movable relative to both the first clutch member and the second clutch member so that the clutch has a first position in which the third clutch member is engaged with the second clutch member but not the first clutch member, the clutch has a second position in which the third clutch member is not engaged with either the second clutch member or the first clutch member, and the clutch has a third position in which the third clutch member is engaged with the first clutch member but not the second clutch member.

2. The device of claim 1 wherein the first clutch member is defined by drive features formed on part of the second housing and arranged to be engaged with complementary drive features of the third clutch member, and wherein the second clutch member is defined by drive features formed on part of the first side gear and arranged to be engaged with complementary drive features of the third clutch member.

3. The device of claim 1 wherein the second position is between the first position and the third position so that the third clutch member is moved axially in a first direction from the second position to the first position, and the third clutch member is moved axially in a second direction from the second position to the third position.

4. The device of claim 1 wherein the first clutch member is defined at least in part by teeth formed on part of the second housing, and the third clutch member has a first set of teeth that are arranged to mesh with the teeth of the first clutch member.

5. The device of claim 4 wherein the second clutch member is defined at least in part by teeth formed on part of the side gear, and the third clutch member has a second set of teeth that are arranged to mesh with the teeth of the second clutch member.

6. The device of claim 1 which also includes an actuator carried by the first housing and operable to move the third clutch member relative to the first clutch member and the second clutch member.

7. The device of claim 6 wherein the actuator is an electromagnetic actuator having a coil that, when powered, produces a magnetic field to drive a drive member that in turn moves the third clutch member.

8. The device of claim 7 wherein the actuator includes a magnet that is coupled to the drive member for movement with the drive member, and the actuator has a retention surface to which the magnet is magnetically coupled when the clutch is in the first position so that the drive member retains the third clutch member in a position that corresponds to the first position of the clutch even when electricity supply to the coil is reduced or terminated while the clutch is in the first position.

9. The device of claim 7 wherein the actuator includes a magnet that is coupled to the drive member for movement with the drive member, and the actuator has a retention surface to which the magnet is magnetically coupled when the clutch is in the third position so that the drive member retains the third clutch member in a position that corresponds to the third position of the clutch even when electricity supply to the coil is reduced or terminated while the clutch is in the third position.

10. The device of claim 7 wherein the actuator includes a magnet that is coupled to the drive member for movement with the drive member, and the actuator has a first retention surface to which the magnet is magnetically coupled when the clutch is in the first position so that the drive member retains the third clutch member in a position that corresponds to the first position of the clutch even when electricity supply to the coil is reduced or terminated while the clutch is in the first position, and wherein the actuator has a second retention surface to which the magnet is magnetically coupled when the clutch is in the third position so that the drive member retains the third clutch member in a position that corresponds to the third position of the clutch even when electricity supply to the coil is reduced or terminated while the clutch is in the third position.

11. The device of claim 10 which also includes at least one biasing member that provides a force on the drive member that retains the drive member and the third clutch member in a position that corresponds to the second position of the clutch in at least some operating conditions of the device.

12. The device of claim 7 which also includes at least one biasing member that provides a force on the drive member that retains the drive member and the third clutch member in a position that corresponds to the second position of the clutch in at least some operating conditions of the device.

13. A drivetrain device, comprising:

an outer housing arranged to be rotated by a vehicle motive power source;

an inner housing received at least partially in the outer housing and capable of rotation relative to the outer housing;

differential gears coupled to the inner housing, the differential gears including at least one pinion gear, a first side gear engaged with the pinion gear, and a second side gear engaged with the pinion gear; and a clutch having a first clutch member that is coupled to the inner housing, a second clutch member that is coupled to the first side gear, and a third clutch member that is coupled to the outer housing and slidably movable relative to each of the outer housing, the first clutch member and the second clutch member, wherein the clutch has a first position in which the third clutch member is engaged with and co-rotates with the second clutch member, the clutch has a second position in which the third clutch member is not engaged with either the second clutch member or the first clutch member, and the clutch has a third position in which the third clutch member is engaged with and co-rotates with the first clutch member.

14. The device of claim 13 wherein the first clutch member is defined at least in part by teeth formed on part of the inner housing, and the third clutch member has a first set of teeth that are arranged to mesh with the teeth of the first clutch member, and wherein the second clutch member is defined at least in part by teeth formed on part of the side gear, and the third clutch member has a second set of teeth that are arranged to mesh with the teeth of the second clutch member.

15. The device of claim 13 which also includes an actuator carried by the outer housing and operable to move the third clutch member relative to the first clutch member and the second clutch member, wherein the actuator is an electromagnetic actuator having a coil that, when powered, produces a magnetic field to drive a drive member that in turn moves the third clutch member.

16. The device of claim 15 wherein the actuator includes a magnet that is coupled to the drive member for movement with the drive member, and the actuator has a retention surface to which the magnet is magnetically coupled when the clutch is in the first position so that the drive member retains the third clutch member in a position that corresponds to the first position of the clutch even when electricity supply to the coil is reduced or terminated while the clutch is in the first position.

17. The device of claim 15 wherein the actuator includes a magnet that is coupled to the drive member for movement with the drive member, and the actuator has a retention surface to which the magnet is magnetically coupled when the clutch is in the third position so that the drive member retains the third clutch member in a position that corresponds to the third position of the clutch even when electricity supply to the coil is reduced or terminated while the clutch is in the third position.

18. The device of claim 15 wherein the actuator includes a magnet that is coupled to the drive member for movement with the drive member, and the actuator has a first retention surface to which the magnet is magnetically coupled when the clutch is in the first position so that the drive member retains the third clutch member in a position that corresponds to the first position of the clutch even when electricity supply to the coil is reduced or terminated while the clutch is in the first position, and wherein the actuator has a second retention surface to which the magnet is magnetically coupled when the clutch is in the third position so that the drive member retains the third clutch member in a position that corresponds to the third position of the clutch even when electricity supply to the coil is reduced or terminated while the clutch is in the third position.

19. The device of claim 18 which also includes at least one biasing member that provides a force on the drive member that retains the drive member and the third clutch member in a position that corresponds to the second position of the clutch in at least some operating conditions of the device.

20. The device of claim 15 which also includes at least one biasing member that provides a force on the drive member that retains the drive member and the third clutch member in a position that corresponds to the second position of the clutch in at least some operating conditions of the device.

* * * * *